United States Patent
Hofmann et al.

(10) Patent No.: US 7,892,654 B2
(45) Date of Patent: Feb. 22, 2011

(54) METHOD FOR STEEL STRIP COATING AND A STEEL STRIP PROVIDED WITH SAID COATING

(75) Inventors: Harald Hofmann, Dortmund (DE); Manfred Meurer, Rheinberg (DE); Bernd Schuhmacher, Dortmund (DE); Slavcho Topalski, Dortmund (DE)

(73) Assignee: ThyssenKrupp Steel AG, Duisburg (DE)

( * ) Notice: Subject to any disclaimer, the term of this patent is extended or adjusted under 35 U.S.C. 154(b) by 782 days.

(21) Appl. No.: 11/816,986

(22) PCT Filed: Feb. 1, 2006

(86) PCT No.: PCT/EP2006/050597
§ 371 (c)(1),
(2), (4) Date: Oct. 12, 2007

(87) PCT Pub. No.: WO2006/089832
PCT Pub. Date: Aug. 31, 2006

(65) Prior Publication Data
US 2008/0271823 A1    Nov. 6, 2008

(30) Foreign Application Priority Data
Feb. 24, 2005   (DE) .................... 10 2005 008 410

(51) Int. Cl.
B32B 15/18 (2006.01)
C23C 2/28 (2006.01)
C23C 2/06 (2006.01)
C23C 2/02 (2006.01)

(52) U.S. Cl. ............... 428/653; 428/659; 428/938; 428/939; 148/531; 148/533; 148/537; 427/406; 427/433

(58) Field of Classification Search ............... None
See application file for complete search history.

(56) References Cited

U.S. PATENT DOCUMENTS

| | | | | |
|---|---|---|---|---|
| 4,257,549 A | * | 3/1981 | Bricmont | 228/235.2 |
| 4,546,051 A | * | 10/1985 | Uchida et al. | 428/653 |
| 2003/0155048 A1 | | 8/2003 | Zeizinger et al. | |
| 2006/0179638 A1 | * | 8/2006 | Engl et al. | 29/527.7 |

(Continued)

FOREIGN PATENT DOCUMENTS

DE   199 00 199   7/2002

(Continued)

OTHER PUBLICATIONS

International Search Report for PCT/EP2006/050597 dated Sep. 2007.

*Primary Examiner*—John J Zimmerman
(74) *Attorney, Agent, or Firm*—Proskauer Rose LLP

(57) ABSTRACT

Coating steel strips comprising, in % by weight, C: ≦1.6%, Mn: 6-30%, Al: ≦10%, Ni: ≦10%, Cr: ≦10%, Si: ≦8%, Cu: ≦3%, Nb: ≦0.6%, Ti: ≦0.3%, V: ≦0.3%, P: ≦0.1%, B: ≦0.01%, the rest being iron and unavoidable impurities, and a method of forming steel strips are described. Up to now, such steel strips were not adequately coatable, with a metal coating ensuring outstanding corrosion-resistance and good welding properties. This is ensured by applying an aluminium layer to the steel strip before final annealing and applying the metal coating to said aluminium layer after final annealing.

18 Claims, 2 Drawing Sheets

U.S. PATENT DOCUMENTS

2010/0065160 A1* 3/2010 Meurer et al. ............... 148/531

FOREIGN PATENT DOCUMENTS

| | | | |
|---|---:|---|---:|
| GB | 966994 | | 8/1964 |
| GB | 2122650 | | 1/1984 |
| JP | 09-209105 | * | 8/1997 |
| JP | 2002-235160 | * | 8/2002 |
| WO | WO 2004/055223 | | 7/2004 |

* cited by examiner

METHOD FOR STEEL STRIP COATING AND A STEEL STRIP PROVIDED WITH SAID COATING

CROSS-REFERENCE TO RELATED APPLICATIONS

This application is a National Phase Application of International Application No. PCT/EP2006/050597, filed Feb. 1, 2006, which claims the benefit of and priority to German Application No. 10 2005 008 410.9, filed Feb. 24, 2005, which is owned by the assignee of the instant application. The disclosure of each of the above applications is incorporated herein by reference in its entirety.

FIELD OF THE INVENTION

The invention relates to a method for coating steel strips comprising in % by weight C: $\leq 1.6\%$, Mn: 6-30%, Al: $\leq 10\%$, Ni: $\leq 10\%$, Cr: $\leq 10\%$, Si: $\leq 8\%$, Cu: $\leq 3\%$, Nb: $\leq 0.6\%$, Ti: $\leq 0.3\%$, V: $\leq 0.3\%$, P: $\leq 0.1\%$, B: $\leq 0.01\%$, N: $\leq 1.0\%$, the rest being iron and unavoidable impurities, wherein the steel strip is subjected to final annealing and then coated with a coating of a molten metal. Furthermore, the invention relates to a steel strip, which has a correspondingly composed base material and a metallic coating applied thereto. Dependent on the characteristics demanded by the coating, the coating of a molten metal can include an aluminium/silicon alloy, pure aluminium, pure zinc or a zinc alloy.

BACKGROUND

Steels with high manganese contents, due to their advantageous characteristic combination of high strength of up to 1,400 MPa on the one hand and extremely high elongations (uniform elongations up to 70% and breaking elongations up to 90%) on the other hand, are basically suitable to a special degree for use in the vehicle manufacturing industry, in particular automotive construction. Steels, particularly suitable for this specific application, with high Mn-contents of 7% by weight up to 30% by weight are known for example from the German documents DE 102 59 230 A1, DE 197 27 759 C2 or DE 199 00 199 A1. Flat products fabricated from these steels have isotropic deformation behaviour with high strength and are also ductile at low temperature.

However, counteracting these advantages, steels with higher Mn-contents are susceptible to pitting corrosion and can only be passivated with difficulty. This high propensity, compared to lower alloyed steels, to locally limited but intensive corrosion in the presence of increased chloride ion concentrations makes it difficult to use steels belonging to the material group of highly alloyed sheet steel. In addition, high manganiferous steels are susceptible to surface corrosion, which likewise limits the spectrum of their use.

Therefore, it has been proposed to also provide flat steel products, which are fabricated from high manganiferous steels, with a metallic coating in the way known per se, which protects the steel against corrosive attack. For this purpose, attempts have been made to apply a zinc coating to the steel material electrolytically. Although these attempts have led to zinc-coated strips, whose base material in each case can consist of the highly alloyed steel, which is protected against corrosion by the metallic coating applied thereto, it has been shown that when such sheet metal is welded, problems occur in the area of the welding zone, which are known in the industry under the term "soldering brittleness". As a consequence of welding the grain boundaries in the base metal are infiltrated by liquefied zinc material of the coating. This infiltration causes the material in the surrounding area of the welding zone to lose strength and ductility to such an extent that the welded joint and/or the sheet metal bordering the welded joint no longer fully meets the requirements for stability under load.

Attempts to produce sheet metal which is sufficiently corrosive-resistant and at the same time has good welding properties by the known hot-dip coating methods, remain unsuccessful, because highly alloyed steel strips, in particular such with Mn-contents of more than 6% by weight, after annealing which is essential for the effectiveness of the hot-dip metal coating, are susceptible to heavy surface oxidation. The sheet metal surfaces, oxidized in such a manner, can no longer be wetted by the metallic coating to the necessary degree of uniformity and entirety, so that the aim of total surface area corrosion protection cannot be achieved in this way.

The possibilities, known from the spectrum of steels being highly alloyed but having lower Mn-contents, for improving wettability by applying an intermediate layer of Fe or Ni in the case of steel sheets comprising at least 6% by weight manganese have not led to the desired success.

SUMMARY OF THE INVENTION

The invention features, in one embodiment, a method, which makes it possible to provide such steel strips, which up to now were not adequately coatable, with a metallic coating ensuring outstanding corrosion resistance and good welding properties. Furthermore, a coated steel strip is provided, which can be easily welded without the risk of soldering brittleness.

In one aspect, the invention features coating steel strips, comprising in % by weight C: $\leq 1.6\%$, Mn: 6-30%, Al: $\leq 10\%$, Ni: $\leq 10\%$, Cr: $\leq 10\%$, Si: $\leq 8\%$, Cu: $\leq 3\%$, Nb: $\leq 0.6\%$, Ti: $\leq 0.3\%$, V: $\leq 0.3\%$, P: $\leq 0.1\%$, B: $\leq 0.01\%$, the rest being iron and unavoidable impurities, wherein the steel strip is subjected to final annealing and then coated with a coating of a molten metal, according to the invention an aluminium layer is applied to the steel strip before final annealing, to which the coating is applied after final annealing.

According to the invention, prior to application of the metallic coating forming the actual corrosion protection layer, a thin aluminium layer is applied to the steel strip representing the base material.

In the annealing treatment before the subsequent molten metal coating, the iron of the steel strip diffuses into the aluminium applied according to the invention, so that in the course of annealing, a metallic deposit, substantially consisting of Al and Fe, forms on the steel strip, which then bonds intimately with the substrate formed by the steel strip. The aluminium adhering to the steel strip prevents the surface of the steel strip to be oxidized during annealing of the steel strip prior to the molten metal coating. Subsequently, the aluminium layer acts as a kind of adhesion promoter so that the coating produced by the molten metal adheres firmly over the total surface area of the steel strip, even if the steel strip itself, due to its alloying, presents disadvantageous conditions for this.

Surprisingly, it has also been shown that the aluminium layer, applied according to the invention between the steel strip and the coating, apart from the effects already mentioned, has the advantage that when sheet metal coated according to the invention is welded, it counteracts the soldering brittleness feared in the prior art. Thus, the aluminium layer in combination with the coating applied afterwards prevents the material of the metallic coating from penetrating into the structure of the steel material during welding so that its strength or ductility is permanently impaired. The method according to the invention for coating steel strip makes it possible to also provide such steel strips, which are not adequately coatable with the known methods, with a metallic corrosion-protective surface layer.

The aluminium intermediate layer is preferably applied by means of the inherently known PVD coating process (PVD=physical vapour deposition), wherein aluminium is evaporated and the developing aluminium vapour condenses under vacuum on the steel strip to be coated, so that aluminium is deposited there as a thin layer. The thickness of the aluminium layer applied on the steel strip by PVD coating in this case can be adjusted via the quantity of aluminium vapour.

The method according to the invention is equally suitable for coating steel strips, which are present in the hot-rolled or cold-rolled condition.

A sufficient effect of the coating according to the invention is always guaranteed if the thickness of the aluminium intermediate layer is 50 nm to 1,000 nm.

The coating method according to the invention is particularly suitable for such steel strips, which are highly alloyed, in order to ensure high strength and good elongation characteristics. Accordingly, the object indicated above with regard to a steel strip, which has a steel base material comprising in % by weight C: $\leq$1.6%, Mn: 6-30%, Al: $\leq$10%, Ni: $\leq$10%, Cr: $\leq$10%, Si: $\leq$8%, Cu: $\leq$3%, Nb: $\leq$0.6%, Ti: $\leq$0.3%, V: $\leq$0.3%, P: $\leq$0.1%, B: $\leq$0.01%, the rest being iron and unavoidable impurities and a metallic coating applied thereto, is achieved according to the invention by the fact that an intermediate layer, which substantially consists of Al and Fe, is present between the base material and the metallic coating. The coated steel sheet product fabricated in this way has optimised corrosion resistance and at the same time good welding properties.

In this case, the effects obtained by the invention are particularly ensured if the thickness of the intermediate layer is 50 nm to 1,000 nm.

The effects obtained by the invention work particularly favourably when coating highly alloyed steel strips, which have a manganese content of at least 6% by weight. Thus, it is shown that a steel base material, which in % by weight contains C: $\leq$1.00%, Mn: 20.0-30.0%, Al: $\leq$0.5%, Si: $\leq$0.5%, B: $\leq$0.01%, Ni: $\leq$3.0%, Cr: $\leq$10.0%, Cu: $\leq$3.0%, N: <0.6%, Nb: <0.3%, Ti: <0.3%, V: <0.3%, P: <0.1%, the rest being iron and unavoidable impurities, can be coated particularly well with a corrosion-protective coating, if it is provided beforehand with an aluminium intermediate layer by the method according to the invention. The same applies if a steel is used as base material, which comprises in % by weight C: $\leq$1.00%, Mn: 7.00-30.00%, Al: 1.00-10.00%, Si: >2.50-8.00% (where the sum of Al and Si content is >3.50-12.00%), B: <0.01%, Ni: <8.00%, Cu: <3.00%, N: <0.60%, Nb: <0.30%, Ti: <0.30%, V: <0.30%, P: <0.01%, the rest being iron and unavoidable impurities.

Indeed, for such high manganiferous steel strips the invention discloses a way, which makes it possible to protect these steel strips in an economic manner from corrosion, in such a way that they can be used for producing bodies in the vehicle manufacturing industry, in particular automotive construction, where they are exposed to particularly corrosive media in normal use.

As in the case of conventional hot-dip coating both hot-rolled and cold-rolled steel strips can be coated by the method according to the invention.

In particular, if high manganiferous steel strips are to be coated by the method according to the invention, it has proved advantageous if the annealing temperature, when annealing is performed after application of the intermediate layer, is more than 680° C. and maximum 900° C. In this temperature range, the desired diffusion of the iron of the steel strip into the coating applied beforehand is particularly reliable, so that intimate bonding of the coating on the substrate formed by the steel strip is just as reliable. This has proven to be particularly advantageous if the intermediate layer is applied by PVD coating.

Similar to the known hot dip coating process, the annealing treatment of the steel strip coated by the method according to the invention should take place in transit. The annealing furnace in this case can be part of a hot dip coating plant known per se.

Annealing is preferably performed under an inert gas atmosphere, in order also in this respect to keep the risk of oxidation to a minimum.

Dependent on the plant technology available and the annealing temperature selected in each case the annealing time, if annealing is performed after application of the intermediate layer, should be 30 seconds to 250 seconds, in order to obtain the particular desired degree of diffusion of Fe from the steel strip into the coating. This proves particularly advantageous if the intermediate layer is applied by PVD coating.

With regard to corrosion protection and welding properties the method according to the invention has shown to be particularly advantageous if the layer of molten metal applied to the aluminium intermediate layer according to the invention consists of an Al/Si alloy, pure aluminium, pure zinc and/or a zinc alloy.

A further embodiment of the invention improving the adhesion of the aluminium intermediate layer to the steel strip is characterized in that the surfaces of the steel strip are cleaned prior to application of the aluminium intermediate layer.

After the molten metal coating, skin-pass rolling can be performed in the presently known way in order to optimise surface quality and roughness of the coated strip.

BRIEF DESCRIPTION OF THE DRAWINGS

The invention is explained in detail below on the basis of figures illustrating an exemplary embodiment. There are shown schematically and section-wise in each case.

DESCRIPTION OF THE INVENTION

A high-strength steel, which besides iron and unavoidable impurities, as elements essential for its characteristics comprised in % by weight 20% Mn, 2.7% Al and 2.7% Si, was cast into slabs and finish-rolled in the conventional way to hot-rolled strip and subsequently coiled. The hot-rolled strip obtained possessed a tensile strength $R_m$ of 720 MPa and an elongation A80 of 60%.

The hot-rolled strip obtained in this away was then cold-rolled in a first stage to cold rolled strip with a strain of 30%. Then, intermediate annealing of the cold rolled strip followed, performed at 900° C. After intermediate annealing the steel strip S obtained in this way was cold-rolled in a further stage to final thickness with a strain of 40%.

After cold-rolling the surface of the cold rolled strip was wet chemically cleaned, prior to entering a PVD coating plant.

In the PVD coating plant a 0.5 μm thick aluminium layer was applied to the steel strip S, by aluminium-bearing vapour being directed under vacuum onto the surface of the steel strip S and deposited there.

After PVD coating of the strip with the aluminium layer, the strip was annealed on the move in an annealing furnace at 800° C. with a transit time of 60 seconds under an inert gas atmosphere including 5% $H_2$, the rest $N_2$. Still on the move in the annealing furnace and under the inert gas atmosphere cooling to a temperature of 660° C. took place after this first annealing phase, wherein the steel strip S at this temperature entered a hot dip bath composed of an aluminium silicon alloy.

Figure 1:
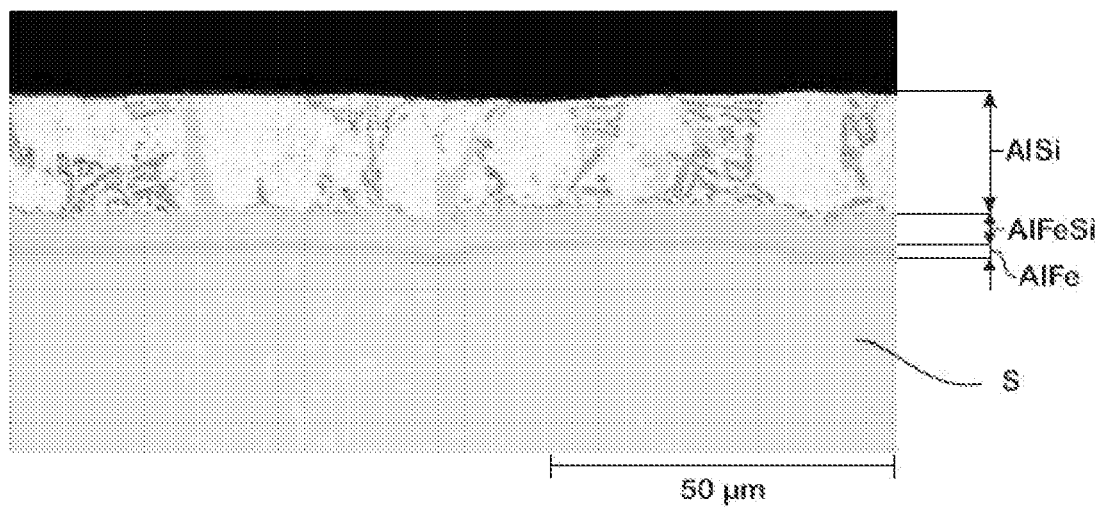
FIG. 1 is a steel strip specimen coated by the method according to the invention in a cutaway view.

In the course of annealing treatment, iron was diffused from the steel material of the steel strip S into the aluminium layer applied to the surface by PVD coating, so that a layer AlFe substantially consisting of Al and Fe developed, which intimately bonded with the steel strip S and firmly adhered thereto (FIG. 1).

In the hot dip bath the steel strip S supporting the AlFe layer was coated with an AlSi layer. As a result of the diffusion processes occurring in the course of the hot dip coating in this case an AlFeSi intermediate coating, which substantially consists of Al, Fe and Si, was formed. The thickness of this AlFeSi intermediate layer is greater than the thickness of the AlFe layer adhering directly to the surface of the steel strip S, however, substantially less than the thickness of the outerlying AlSi layer, substantially consisting of Al and Si (FIG. 1).

After the steel strip S coated in such a manner was removed from the hot dip bath, the thickness of the coating was adjusted in the known way by means of a jet stripping system. Subsequently, the coated steel strip S was cooled down and subjected to skin-pass rolling in order to optimise its surface finish. The coated steel strip S obtained was then oiled and wound into coil ready for dispatch.

Figure 2:
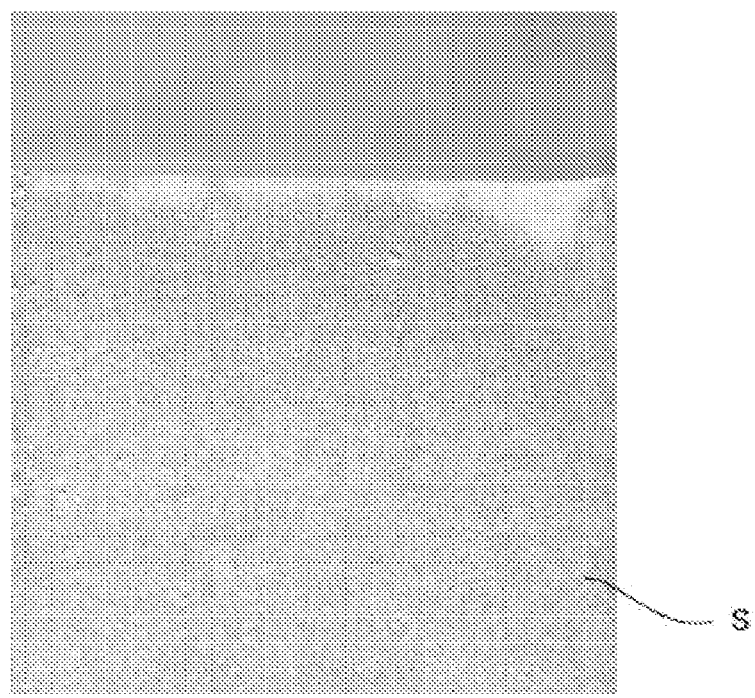
FIG. 2 is the coated steel strip specimen in accordance with FIG. 1 in plan view.

FIG. 2 shows in plan view a cutaway of the steel sheet coated by the method according to the invention described above. The all-over solid and uniform application of the coating can be clearly recognized.

Figure 3:
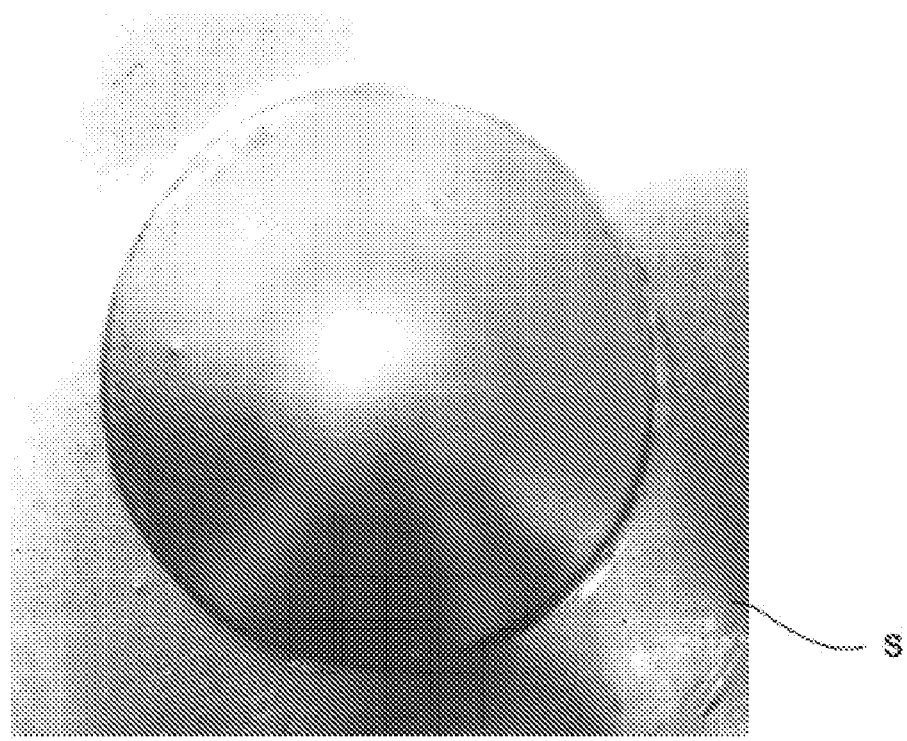
FIG. 3 is the coated steel strip specimen illustrated in FIG. 1 after a ball impact test according to Iron and Steel Test Sheet SEP 1931 in plan view.

Finally, FIG. 3 shows the result of a ball impact test performed on the steel sheet S. It demonstrates the very good adhesion of the coating structure, formed from the AlFe, AlFeSi and AlSi layers, to the steel strip S. Thus, no flaking or comparable damage is to be recognized.

Figure 4:
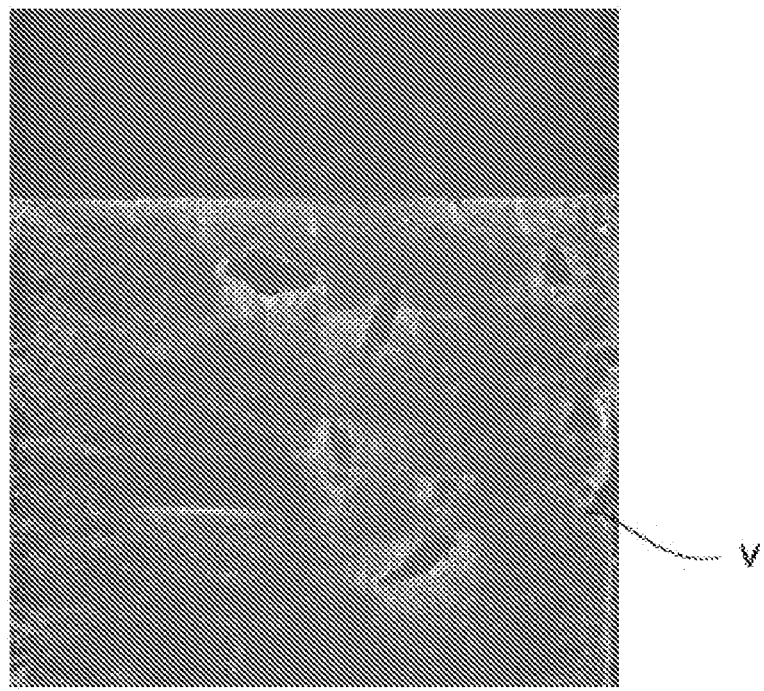
FIG. 4 is a steel strip specimen hot dip coated in the conventional way in plan view.

In contrast to this for comparison, FIG. 4 shows a steel strip V in plan view, which is alloyed exactly in the same way as the steel strip S. Up to the PVD application stage of the aluminium layer it has also been processed in the same way as the steel strip S. At the same time, however, it is clearly evident from FIG. 4 that the steel strip V has virtually no coating after the end of the treatment process.

The invention claimed is:

1. A method for coating a steel strip comprising in % by weight C: ≦1.6%, Mn: 6-30%, Al: ≦10%, Ni: ≦10%, Cr: ≦10%, Si: ≦8%, Cu: ≦3%, Nb: ≦0.6%, Ti: ≦0.3%, V: ≦0.3%, P: ≦0.1%, B: ≦0.01%, N: ≦1.0%, the rest being iron and unavoidable impurities, wherein the steel strip is subjected to final annealing and then coated with a coating of a molten metal, the method comprising:
  applying an aluminum layer to the steel strip before final annealing; and
  applying the coating of molten metal after final annealing.

2. The method of claim 1 wherein the thickness of the aluminum layer is 50 nm to 1,000 nm.

3. The method of claim 1 wherein the annealing temperature during final annealing performed after application of the aluminum layer is from 680° C. to 900° C.

4. The method of claim 1 wherein the annealing time during final annealing is 30 seconds to 250 seconds.

5. The method of claim 1 wherein the coating of the molten metal is applied by hot dip coating.

6. The method of claim 1 wherein the coating of the molten metal, applied after final annealing, includes at least one of an Al/Si alloy, Al, Zn, Al and Zn, and a zinc alloy.

7. The method of claim 1 wherein a surface of the steel strip is cleaned prior to application of the coating.

8. The method of claim 1 wherein the aluminum layer is applied by PVD coating.

9. The method of claim 2 wherein the annealing temperature during final annealing performed after application of the aluminum layer is from 680° C. to 900° C.

10. The method of claim 2 wherein the annealing time during final annealing is 30 seconds to 250 seconds.

11. The method of claim 10 wherein the annealing time during final annealing is 30 seconds to 250 seconds.

12. A steel strip comprising:
  a steel base material, comprising in % by weight C: ≦1.6%, Mn: 6-30%, Al: ≦10%, Ni: ≦10%, Cr: ≦10%, Si: ≦8%, Cu: ≦3%, Nb: ≦0.6%, Ti: ≦0.3%, V: ≦0.3%, P: ≦0.1%, B: ≦0.01%, N: ≦1.0%, the rest being iron and unavoidable impurities;
  a metallic coating applied; and
  an intermediate layer between the steel base material and the metallic coating, the intermediate layer comprising Al and Fe.

13. The steel strip of claim 12 wherein the thickness of the intermediate layer is 50 nm to 1,000 nm.

14. The steel strip of claim 12 wherein the metallic coating is formed by at least one of an Al/Si alloy, Al, Zn and a Zn-alloy.

15. The steel strip of claim 12 wherein the steel base material has the following composition in % by weight:
  C: ≦1.00%,
  Mn: 20.0-30.0%,
  Al: ≦0.5%,
  Si: ≦0.5%,
  B: ≦0.01%,
  Ni: ≦3.0%,
  Cr: ≦10.0%,
  Cu: ≦3.0%,
  N: <0.6%,
  Nb: <0.3%,
  Ti: <0.3%,
  V: <0.3%,
  P: <0.1%,
  the rest being iron and unavoidable impurities.

16. The steel strip of claim 12 wherein the steel base material has the following composition in % by weight:
  C: ≦1.00%,
  Mn: 7.00-30.00%,
  Al: 1.00-10.00%,
  Si: >2.50-8.00%, with Al +Si contents >3.50-12.00%,
B: <0.01%,
Ni: <8.00%,
Cu: <3.00%,
N: <0.60%,
Nb: <0.30%,
Ti: <0.30%,
V: <0.30%,
P: <0.01%,
the rest being iron and unavoidable impurities.

17. The steel strip of claim 13 wherein the steel base material has the following composition in % by weight:
C: ≦1.00%,
Mn: 20.0-30.0%,
Al: ≦0.5%,
Si: ≦0.5%,
B: ≦0.01%,
Ni: ≦3.0%,
Cr: ≦10.0%,
Cu: ≦3.0%,
N: <0.6%,
Nb: <0.3%,
Ti: <0.3%,
V: <0.3%,
P: <0.1%,
the rest being iron and unavoidable impurities.

18. The steel strip of claim 13 wherein the steel base material has the following composition in % by weight:
C: ≦1.00%,
Mn: 7.00-30.00%,
Al: 1.00-10.00%,
Si: >2.50-8.00%,
with Al +Si contents >3.50-12.00%,
B: <0.01%,
Ni: <8.00%,
Cu: <3.00%,
N: <0.60%,
Nb: <0.30%,
Ti: <0.30%,
V: <0.30%,
P: <0.01%,
the rest being iron and unavoidable impurities.

* * * * *